June 12, 1945.  W. J. HUBBARD  2,378,016
PROCESS AND APPARATUS FOR PRODUCING LAMINATED SAFETY GLASS
Filed Dec. 13, 1943  2 Sheets-Sheet 1

Inventor
WILLIAM J. HUBBARD.
By Frank Fraser
Attorney

June 12, 1945. W. J. HUBBARD 2,378,016
PROCESS AND APPARATUS FOR PRODUCING LAMINATED SAFETY GLASS
Filed Dec. 13, 1943 2 Sheets-Sheet 2

Inventor
WILLIAM J. HUBBARD,
By Frank Fraser
Attorney

Patented June 12, 1945

2,378,016

UNITED STATES PATENT OFFICE 2,378,016

PROCESS AND APPARATUS FOR PRODUCING LAMINATED SAFETY GLASS

William J. Hubbard, Toledo, Ohio, assignor to Libbey-Owens-Ford Glass Company, Toledo, Ohio, a corporation of Ohio Application December 13, 1943, Serial No. 514,014

19 Claims. (Cl. 154—2.70)

The present invention relates to an improved process of and apparatus for producing laminated safety glass.

Laminated safety glass comprises two or more sheets of glass having one or more layers of a suitable plastic strengthening material interposed therebetween and bonded thereto to provide a composite structure. According to one process of producing this type of glass, the glass sheets and plastic interlayer are first properly assembled to provide a so-called "sandwich," which is subjected first to a relatively light initial or preliminary pressing and then to a final heat and pressure treatment to complete the compositing of the laminations. This final heat and pressure treatment is ordinarily carried out in an autoclave, with the "sandwich" being subjected to the direct action of a fluid under pressure. However, before being placed in the autoclave, the "sandwich" is prepressed to remove all trapped air, non-condensable gases, etc., from between the laminations and to cause said laminations to stick together to facilitate the subsequent handling thereof as well as to prevent the pressing fluid from creeping in between the laminations during the autoclave treatment and causing defects in the finished sheet.

The prepressing of flat sheets of laminated safety glass can be readily accomplished by passing them between one or more pairs of rotatable rolls of a suitable resilient, compressible material such as rubber. However, this method is not satisfactory in prepressing bent or curved sheets of laminated safety glass because of the increased handling of the glass, increased time required for the prepressing operation, and increased liability of breakage. In fact, it is extremely difficult to prepress curved or bent "sandwiches" so that they can be submerged unprotected in the autoclave without danger of the pressing fluid working in between the laminations, and this is particularly true in the case of sheets having irregular or compound curvatures. For this reason, it has been customary to protect the sandwiches from the pressing fluid in the autoclave by placing them in rubber bags or the like from which the air is exhausted.

It is an aim of this invention to provide an improved process and apparatus whereby the initial or preliminary pressing of laminated safety glass sandwiches can be effected in a rapid, efficient manner and which are especially adaptable to the prepressing of bent or curved sheets of laminated safety glass, although not limited thereto.

Another object of the invention is to provide an improved process and apparatus for prepressing bent or curved laminated safety glass sandwiches whereby the several laminations will be secured to one another in such a manner that the sandwiches can be subsequently subjected to the direct action of a pressing fluid without danger of the fluid creeping in between the laminations.

Another object of the invention is the provision of an improved process and apparatus wherein not only the prepressing of the laminated safety glass sandwiches but also the final heat and fluid pressure treatment thereof can be accomplished, if desired, in a single continuous operation.

A further object of the invention is the provision of an improved process and apparatus wherein only the prepressing of the laminated safety glass sandwiches or both the prepressing and final heat and fluid pressure treatment thereof is effected by the application of pressure created by centrifugal force.

Other objects and advantages of the invention will become more apparent during the course of the following description when taken in connection with the accompanying drawings.

In the drawings wherein like numerals are employed to designate like parts throughout the same:

Figure 1:
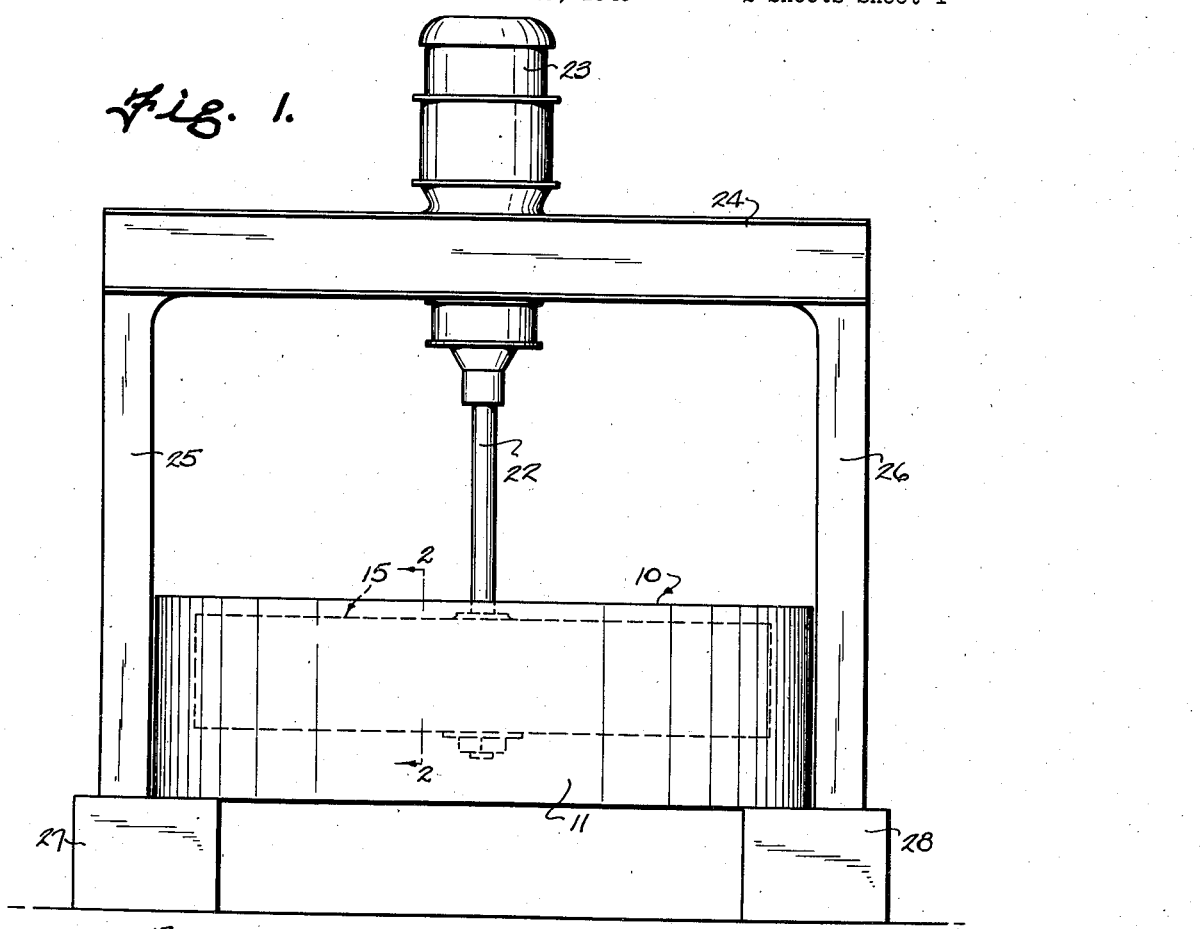
Fig. 1 is a front elevation of one form of apparatus which can be used in carrying out the present invention.

With reference now to the drawings, the apparatus herein provided for carrying out the invention comprises a circular stationary casing 10, having a vertical side wall 11 provided at its upper edge with an inwardly directed horizontal flange 12 terminating in a down-turned lip 13 to define an opening 14 in the top of said casing.

Arranged within the casing 10 is a circular container or tub 15 having a bottom 16 and vertical side wall 17, said side wall being formed at its upper edge with an inwardly directed flange 18 defining a central opening 19 through which the laminated safety glass sandwiches are introduced into the tub and removed threrefrom after processing. The flange 18 is provided with an offset horizontal supporting ledge 20 upon which rests a removable cover plate 21. The container 15 is carried at the lower end of a vertical shaft 22 driven from a motor 23 supported upon a suitable framework made up of a horizontal supporting beam 24 and vertical posts 25 and 26 mounted upon base blocks 27 and 28 respectively, which also support the outer casing 10.

Arranged within the container 15 along the side wall 17 thereof and resting freely upon the bottom 16 are one or more removable work supporting units 29. Each of these units includes a base or body member 30 which may be of wood and having its outer surface 31 curved to correspond to the curvature of the side wall 17 of the container 15. The inner surface 32 of base member 30 is preferably flat and secured thereto by a suitable type adhesive is a nest block 33 of plaster, plastic or other preferred material. The inner surface 34 of nest block 33 is shaped to conform to that of the safety glass sandwich which is designated by the letter A. Thus, if flat sheets are to be bonded together, the inner surface of the nest block will be flat, whereas if curved sandwiches are to be processed, the inner surface of the nest block will be correspondingly curved as illustrated in the drawings.

Figure 5:
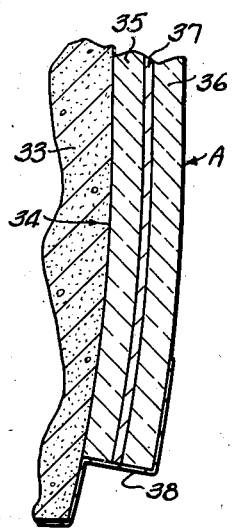
Fig. 5 is an enlarged sectional view of a sheet of regular laminated safety glass supported in position for pressing.

In Fig. 5 is shown a regular laminated safety glass sandwich A composed of two sheets of glass 35 and 36 and an interposed layer of plastic 37. After the glass and plastic laminations have been properly assembled with one another, they are mounted upon the nest block 33 and secured thereto by strips of Scotch tape 38 or by suitable clamps or the like.

Instead of providing a separate base member 30 and nest block 33, the work supporting unit 29 may be formed of one piece from neoprene, synthetic rubber, or other suitable material.

Figure 2:
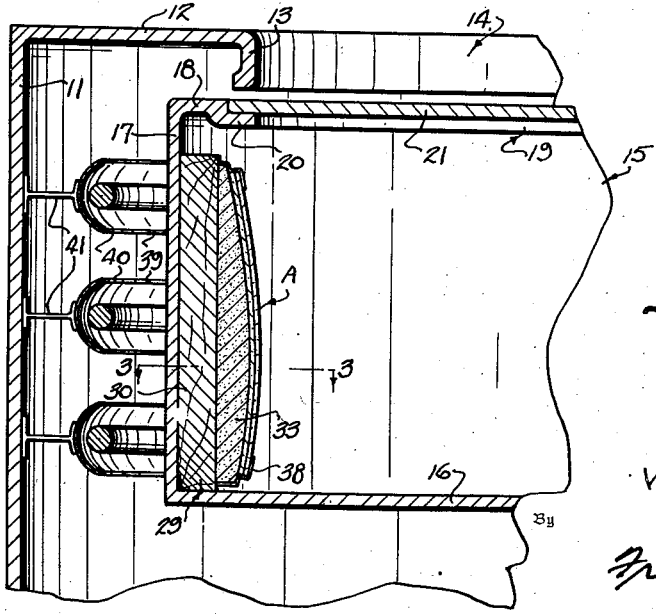
Fig. 2 is a vertical section therethrough taken substantially on line 2—2 of Fig. 1, showing a laminated safety glass "sandwich" in position to be pressed.
Figure 3:
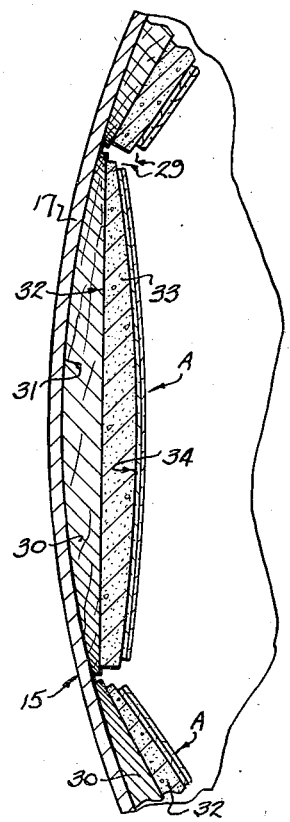
Fig. 3 is a horizontal section taken substantially on line 3—3 of Fig. 2.

In carrying out the invention, the desired number of glass-plastic assemblies A are first mounted upon the nest blocks 33 after which the work supporting units are arranged on edge around the inside of the container 15 as shown in Figs. 2 and 3, with the glass-plastic assemblies in a vertical position. At this time, the container is at room temperature. After the work supporting units have been properly arranged, the container is placed in rotation and the glass-plastic assemblies revolved at a sufficiently high speed and for a sufficient length of time necessary to force all trapped air, non-condensable gases, etc., from between the laminations. Upon being rotated, the inner glass sheet 36 will be forced outwardly by centrifugal force and will thus provide the pressure necessary to expel any trapped air from between the laminations as well as bringing the laminations into intimate contact with one another. The speed of rotation of the container as well as the time cycle will of course vary with different thicknesses of glass sheets and number of laminations. However, by way of example, it has been found that safety glass sandwiches, made up of two sheets of three-sixteenths inch glass and a polyvinyl acetal plastic innerlayer of fifteen-thousandths inch thickness, can be rotated at 900 R. P. M. for three minutes and that all trapped air will be effectively removed from between the laminations.

After the trapped air has been removed, heat is applied to the laminations without interrupting the speed of rotation of the container to cause a softening of the plastic interlayer and effect the prepressing of the laminations. This heating can be accomplished in any suitable manner such as by the use of electric resistance units 39 encircling the container 15 and supported in front of reflectors 40 carried by brackets 41 secured to the stationary casing 10. The temperature of the glass-plastic assemblies A is preferably brought up to around 180 degrees Fahrenheit, where it is maintained for approximately ten minutes to complete the prepressing of the laminations.

After being prepressed, the laminated sheets may be removed from the container 15, and introduced into a separate autoclave where they can be subjected to final heat and pressure treatment to complete the compositing of the laminations. In such an operation, the sheets of safety glass could be subjected to the direct action of a heated fluid at 275 degrees Fahrenheit under 225 pounds pressure per square inch for seven minutes. However, according to the present invention, the final pressing operation can also be performed in the apparatus herein provided, if desired, without interrupting the rotation of the container 15 or disturbing the position of the prepressed sheets of safety glass therein.

Figure 4:
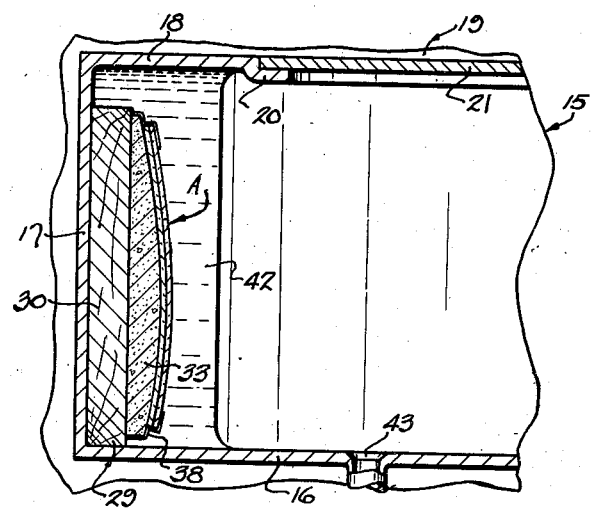
Fig. 4 is a vertical section illustrating the final pressing of the laminations using a pressing fluid.

To secure final pressing of the laminations, a suitable type liquid such as hydrocarbon oil, heated to about 300 degrees Fahrenheit, is introduced into the container 15 through the opening 19, and by the rotation of said container is thrown outwardly toward and held against the sheets of safety glass A by centrifugal force as indicated at 42 in Fig. 4. This will effect an increase in both the temperature of the safety glass and the pressure exerted thereon. After the container has been rotated for from five to six minutes, the oil is permitted to cool down to around 150 degrees Fahrenheit, at which time the container is stopped and the completed units removed. The oil can be drained from the container, when desired, through an outlet 43.

Figure 6:
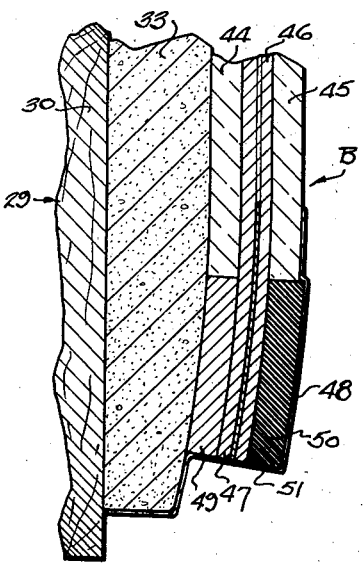
Fig. 6 is a similar view showing another type of laminated safety glass.

In the type of safety glass shown in Fig. 5, the two sheets of glass 35 and 36 and plastic interlayer 37 are of the same size, with the glass sheets being of the same thickness. However, it will be readily appreciated that the process and apparatus of this invention can be employed in the prepressing and also for the final pressing, if desired, of various types of laminated safety glass as well as safety glass made up of any preferred number of glass sheets and plastic interlayers and with the glass sheets being of the same or different thicknesses. For example, in Fig. 6 is shown a safety glass unit B including two sheets of glass 44 and 45 and plastic interlayer 46, and in which the plastic interlayer extends beyond the edges of the glass sheets to provide a flexible attaching flange 47 in which may be embedded a metal reinforcing member 48. This type of unit has been found extremely satisfactory for use in aircraft windshields and windows, as the extended flange 47 provides a flexible mounting for the glass which greatly reduces the liability of breakage upon twisting or weaving of the plane. It is also sometimes desirable to build up the thickness of the extended plastic flange 47 by securing thereto an auxiliary strip of plastic 49. In such case, a strip of rubber or other suitable material 50 is placed inwardly of the plastic flange 47 and held thereagainst by the fastening means 51 which secures the safety glass assembly to the work supporting unit 29. During the pressing of the laminations, the strip 50 will exert the necessary pressure upon the plastic flange 47 to secure adhesion between said flange and the auxiliary plastic strip 49.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated safety glass, which comprises assembling a plurality of glass and plastic laminations to form a sandwich, arranging the sandwich in a substantially vertical position, and rotating the sandwich bodily about a vertical axis to effect the securing of the laminations together by centrifugal force.

2. The process of producing laminated safety glass, which comprises asembling a plurality of glass and plastic laminations to form a sandwich, arranging the sandwich in a substantially vertical position, rotating the sandwich bodily about a vertical axis to effect the securing of the laminations together by centrifugal force, and heating the sandwich during the rotation thereof.

3. The process of producing laminated safety glass, which comprises asembling a plurality of glass and plastic laminations to form a sandwich, arranging the sandwich in a substantially vertical position, rotating said sandwich through a circular path about a vertical axis to effect an initial securing of the laminations together by centrifugal force, and then subjecting the sandwich to fluid pressure while continuing the rotation thereof to increase the pressure thereon and effect final bonding of said laminations together.

4. The process of producing laminated safety glass, which comprises assembling a plurality of glass and plastic laminations to form a sandwich, arranging the sandwich in a substantially vertical position, rotating said sandwich through a circular path about a vertical axis to effect an initial securing of the laminations together by centrifugal force, heating the sandwich during the rotation thereof, and then subjecting the sandwich to the action of a heated fluid while continuing the rotation thereof to increase the temperature thereof and pressure thereon to effect final bonding of said laminations together.

5. The process of producing laminated safety glass, which comprises assembling a plurality of glass and plastic laminations to form a sandwich, and rotating the sandwich bodily through a circular path to effect the bonding of the laminations together by pressure created by the centrifugal force incident to said rotation.

6. The process of producing laminated safety glass, which comprises assembling a plurality of glass and plastic laminations to form a sandwich, rotating the sandwich bodily through a circular path to effect the bonding of the laminations together by pressure created by the centrifugal force incident to said rotation, and simultaneously heating the sandwich during the rotation thereof.

7. The process of producing laminated safety glass, which comprises assembling a plurality of glass and plastic laminations to form a sandwich, subjecting the sandwich to centrifugal force to press the laminations against one another, and simultaneously heating the laminations to cause them to adhere to one another.

8. The process of producing laminated safety glass, which comprises assembling a plurality of glass and plastic laminations to form a sandwich, rotating the sandwich bodily through a circular path to effect an initial securing of the laminations together by presure created by the centrifugal force incident to said rotation, and then subjecting the sandwich to the direct action of fluid under centrifugal pressure during continued rotation of said sandwich to complete the bonding of the laminations.

9. The process of producing laminated safety glass, which comprises assembling a plurality of glass and plastic laminations to form a sandwich, rotating the sandwich bodily through a circular path to effect an initial securing of the laminations together by pressure created by the centrifugal force incident to said rotation, simultaneously heating the sandwich, and then subjecting the sandwich to the direct action of a heated fluid under centrifugal pressure during continued rotation of said sandwich to complete the bonding of the laminations.

10. In the production of laminated safety glass wherein glass and plastic laminations are arranged in properly assembled relationship to form a sandwich and subjected first to a preliminary pressing and then to a final pressure treatment, the step of prepressing the sandwiches by subjecting them to centrifugal force.

11. In the production of laminated safety glass wherein glass and plastic laminations are arranged in properly assembled relationship to form a sandwich and subjected first to a preliminary pressing and then to a final pressure treatment, the step of prepressing the sandwiches by subjecting them to centrifugal force, and simultaneously heating the same.

12. Apparatus for producing laminated glass comprising two sheets of glass and an interposed sheet of plastic material assembled to form a sandwich, including a rotatable container for receiving the sandwich therein, and means for rotating said container to effect the securing of the laminations together by pressure created by the centrifugal force incident to said rotation.

13. Apparatus for producing laminated glass comprising two sheets of glass and an interposed sheet of plastic material assembled to form a sandwich, including a rotatable container for receiving the sandwich therein, means for rotating said container to effect the securing of the laminations together by pressure created by the centrifugal force incident to said rotation, and means for heating said sandwich during the rotation thereof.

14. Apparatus for producing laminated glass comprising two sheets of glass and an interposed sheet of plastic material assembled to form a sandwich, including a rotatable container, a work supporting unit arranged within said container, means for securing the sandwich to said work supporting unit, and means for rotating said container to effect the securing of the laminations together by pressure created by the centrifugal force incident to said rotation.

15. Apparatus for producing laminated glass comprising two sheets of glass and an interposed sheet of plastic material assembled to form a sandwich, including a rotatable container, a work supporting unit arranged within said container, means for securing the sandwich to said work supporting unit, means for rotating said container to effect the securing of the laminations together by pressure created by the centrifugal force incident to said rotation, and means for heating said sandwich during the rotation thereof.

16. Apparatus for producing laminated glass comprising two sheets of glass and an interposed sheet of plastic material assembled to form a sandwich, including a circular rotatable container, a work supporting unit arranged within said container and having an inner surface shaped to correspond to the shape of the sandwich, means for securing the sandwich in a substantially vertical position against said work supporting unit, and means for rotating said container to effect the securing of the laminations together by pressure created by the centrifugal force incident to said rotation.

17. Apparatus for producing laminated glass comprising two sheets of glass and an interposed sheet of plastic material assembled to form a sandwich, including a circular rotatable container, a work supporting unit arranged within said container and having an inner surface shaped to correspond to the shape of the sandwich, means for securing the sandwich in a substantially vertical position against said work supporting unit, means for rotating said container to effect the securing of the laminations together by pressure created by the centrifugal force incident to said rotation, and means for heating said sandwich during the rotation thereof.

18. Apparatus for producing bent laminated glass comprising two sheets of glass and an interposed sheet of plastic material assembled to form a sandwich, including a circular rotatable container, a work supporting unit arranged within said container along the side thereof and having an inner surface curved to correspond to the curvature of the laminations to be joined, means for securing the assembled laminations in a vertical position to said work supporting unit, and means for rotating said container to effect the securing of the laminations together by pressure created by the centrifugal force incident to said rotation.

19. Apparatus for producing bent laminated glass comprising two sheets of glass and an interposed sheet of plastic material assembled to form a sandwich, including a circular rotatable container, a work supporting unit arranged within said container along the side thereof and having an inner surface curved to correspond to the curvature of the laminations to be joined, means for securing the assembled laminations in a vertical position to said work supporting unit, means for rotating said container to effect the securing of the laminations together by pressure created by the centrifugal force incident to said rotation, and means for heating said sandwich during the rotation thereof.

WILLIAM J. HUBBARD.